United States Patent [19]

Nakazono

[11] 4,128,853
[45] Dec. 5, 1978

[54] OPERATING MECHANISM OF TAPE RECORDER

[75] Inventor: Akio Nakazono, Nagoya, Japan

[73] Assignee: Shin-Shirasuna Electric Corp., Aichi, Japan

[21] Appl. No.: 840,278

[22] Filed: Oct. 7, 1977

[30] Foreign Application Priority Data

Oct. 20, 1976 [JP] Japan .................................. 51/140906
Feb. 23, 1977 [JP] Japan .................................. 52/21687
Feb. 23, 1977 [JP] Japan .................................. 52/21688

[51] Int. Cl.$^2$ .......................... G11B 21/22; G11B 5/54
[52] U.S. Cl. .................................................... 360/105
[58] Field of Search .......................... 360/105, 96, 137

[56] References Cited
U.S. PATENT DOCUMENTS 3,921,215  11/1975  Asami .................................. 360/137

Primary Examiner—Robert S. Tupper
Attorney, Agent, or Firm—Bacon & Thomas

[57] ABSTRACT

An operating mechanism of a tape recorder, wherein when pause, cue or review is effected during recording or playback, a pinch roller and head are spaced apart from the tape. Futhermore, by the cue or review being effected, the playback position will not be released, but upon retraction of a subchassis carrying the pinch roller and head, the pressure contact relationship between the pinch roller and the capstan with the tape held therebetween will be released so that upon cessation of the cue or review, playback may be started immediately. Still furthermore, the subchassis will be retracted by an amount controlled by the amount of push-in of the cue lever or the review lever, whereafter the pinch roller and capstan will be released from their engagement in accordance with the amount of retraction of the subchassis to reproduce the signals recorded on the tape, and then the head will be spaced apart fom the tape to stop reproduction of the recorded signals, so that the playback operation may be resumed immediately after the cue or the review is interrupted.

3 Claims, 2 Drawing Figures

OPERATING MECHANISM OF TAPE RECORDER

This invention relates to an operating mechanism of a tape recorder.

Tape recorders have been put into use which have a mechanism for enabling fast forward movement (cue) or rewind (review) of the tape during recording or playback operation and capable of assuming a position in which signals recorded on a recording medium are reproduced and a position in which such recorded signals are not reproduced. In these tape recorders, it is required that the pinch roller and head be spaced apart from the tape when pause, cue or review is effected during recording or playback. Furthermore, it may be required that the playback position be not released by the cue or review being effected but that upon retraction of the subchassis, the pressure contact relationship between the pinch roller and the capstan with the tape being held therebetween be released, so that upon cessation of the cue or review, playback may be started immediately. It may also be required that the playback position be not released by the cue or the review being effected and the subchassis be retracted by an amount controlled by the amount of push-in of the cue lever or the review lever, whereafter the pinch roller and capstan be released from their engagement in accordance with the amount of retraction of the subchassis to reproduce the signals recorded on the recording tape, and then the head be spaced apart from the tape to stop reproduction of the signals recorded on the recording tape, wherein it is necessary that the playback operation be resumed immediately after the cue or the review is interrupted.

Various mechanisms for such purposes have heretofore been proposed, but any of them has involved a number of parts and complicated construction and none of them is not entirely satisfactory.

Accordingly, it is an object of this invention to provide an operating mechanism of a tape recorder which involves a smaller number of parts and can reliably perform the above-mentioned functions by a simplified and compact construction.

Other objects, features and advantages of this invention will become apparent from the following detailed description taken in conjunction with the accompanying drawings.

Figure 1:
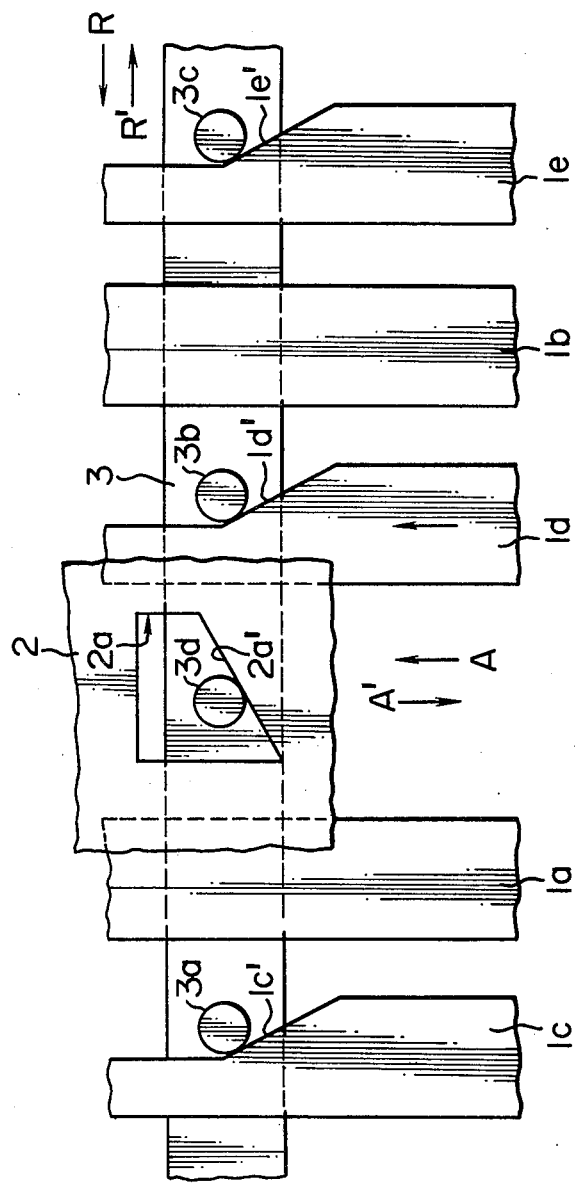
FIG. 1 is a fragmentary plan view schematically showing the operating mechanism of a tape recorder according to an embodiment of this invention.

In FIG. 1, references $1a$ and $1b$ designate a recording lever and a playback lever, respectively, and numeral 2 denotes a subchassis slidably disposed above (as viewed in the direction perpendicular to the plane of the drawing sheet) and in parallel, spaced apart relationship with these levers. This subchassis 2 may be advanced in the direction of arrow A with the aid of a spring force upon push-in of the playback lever $1b$ or both of the playback lever and the recording lever $1a$, to assume the position shown, with a result that a pinch roller and a head (not shown) may be brought into engagement with a tape (not shown). Designated by $1c$, $1d$, and $1e$ are a pause lever, a review lever and a cue lever, respectively. In this embodiment, the pause lever $1c$, review lever $1d$ and cue lever $1e$ are respectively formed with edges $1c'$, $1d'$ inclined rightwardly downwardly as viewed in the drawing. The subchassis 2 is formed with a through-aperture $2a$ having an edge $2a'$ inclined in the opposite direction to those edges, namely, rightwardly upwardly as viewed in the drawing. On the opposite side from the subchassis 2, namely, below the levers (as viewed in the direction perpendicular to the plane of the drawing sheet), a slider bar 3 is slidably disposed in spaced apart relationship with and transversely of those levers. This slider bar 3 is formed with projections $3a$, $3b$ and $3c$ engageable with the edges $1c'$, $1d'$ and $1e'$ of the levers respectively and a projection $3d$ engageable with the edge $2a'$ of the through-aperture $2a$ formed in the subchassis 2. In this instance, as already noted, the subchassis 2 overlies the levers $1a$ to $1e$ as viewed in the direction perpendicular to the plane of the drawing sheet and therefore, the projection $3d$ is correspondingly longer than the other projections $3a$ to $3c$. Also, the slider bar 3 is spring-biased in the direction of arrow R so that the respective projections are engaged with the inclined edges of the levers and subchassis. The position shown is that in which, as already described, the subchassis 2 has been advanced upon push-in of the playback lever $1b$ or both of the palyback lever and the recording lever $1a$. In this position, as shown, the inclined edge $2a'$ of the through-aperture $2a$ formed in the subchassis 2 is engaged with the projection $3d$ in the through-aperture $2a$.

The shown position, as already noted, is the recording or the playback position in which the subchassis 2 has been advanced with the pinch roller and head brought into engagement with the tape. In this position, when, for example, the tape is to be rewound, namely, the review is to be effected, the review lever $1d$ is pushed in the direction of arrow. Thereupon, because of the inclined edge $1d'$ of the lever $1d$ being engaged with the projection $3b$, the slider bar 3 is moved in the direction of arrow R' against the above-mentioned spring bias by a distance determined by the angle of inclination of the inclined edge $1d'$ and the amount of push-in of the lever $1d$, and at the same time, the projection $3d$ in engagement with the edge $2a'$ of the subchassis 2 is moved with the slider bar 3, so that due to the edge $2a'$ of the subchassis being inclined in the opposite direction to the edges of the levers, the subchassis is retracted in the direction of arrow A' against the spring bias which is acting to advance the subchassis, with a result that the review operation takes place while, at the same time, the pinch roller and head are spaced apart from the tape. If the review lever $1d$ is then released from its pushed-in position, the shown position will immediately be restored. It will be readily appreciated that the above-described operation may likewise be effected also by pushing in the cue lever $1e$ or the pause lever $1c$.

As will be apparent from what has hitherto been described, the present invention provides a very simple construction in which a common slider bar 3 is provided in association with various levers $1c$ to $1e$ and subchassis 2, whereby the intended function described above may be fully performed.

In the above-described embodiment, there are provided all of the recording lever $1a$, the playback lever $1b$, the pause lever $1c$, the review lever $1d$ and the cue lever $1e$, whereas it will be appreciated that the present invention is equally applicable where at least one of the recording lever $1a$ and the playback lever $1b$ and at least one of the pause lever $1c$, the review lever $1d$ and the cue lever $1e$ are provided.

Figure 2:
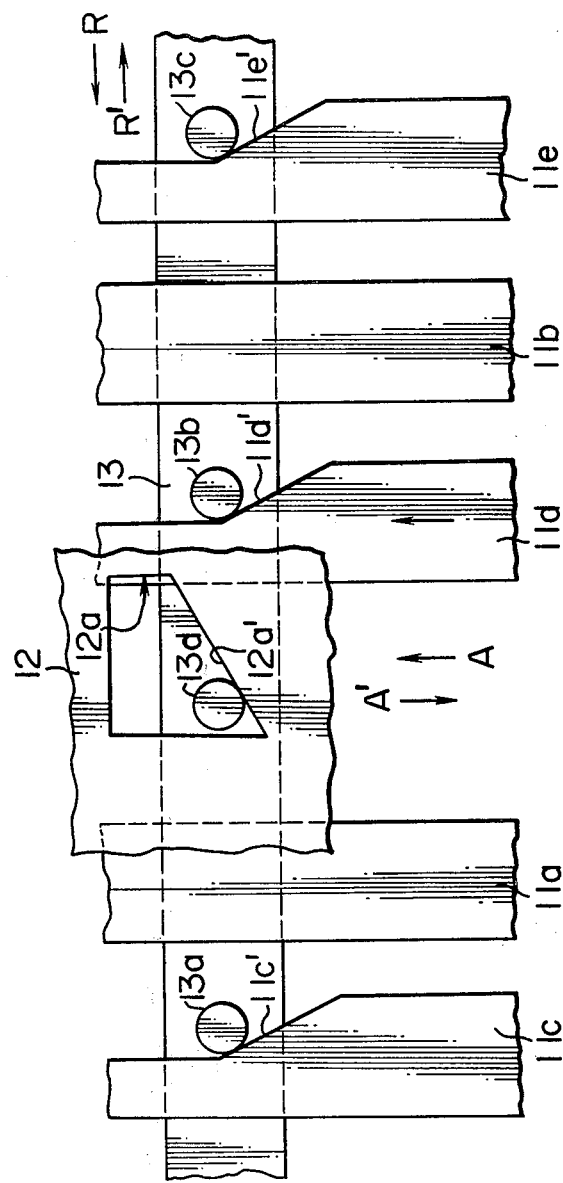
FIG. 2 is a similar view showing another embodiment of this invention.

Referring now to FIG. 2, there is shown another embodiment of this invention, wherein reference characters 11a and 11b designate a recording lever and a playback lever, respectively, and numeral 12 denotes a subchassis slidably disposed above (as viewed in the direction perpendicular to the plane of the drawing sheet) and in parallel, spaced apart relationship with these levers. This subchassis 12 may be advanced in the direction of arrow A with the aid of a spring force upon push-in of the playback lever 11b or both of the playback lever and the recording lever 11a, to assume the position shown, with a result that a pinch roller and a head (not shown) may be brought into engagement with a tape (now shown). The pinch roller is adapted to be urged against the capstan with the tape nipped therebetween. Designated by 11c, 11d and 11e are a pause lever, a review lever and cue lever, respectively. In this embodiment, the pause lever 11c, review lever 11d and cue lever 11e are respectively formed with edges 11c', 11d' 11e' inclined rightwardly downwardly as viewed in the drawing. The subchassis 12 is formed with a through-aperture 12a having an edge 12a' inclined in the opposite direction to those edges, namely, rightwardly upwardly as viewed in the drawing. On the opposite side from the subchassis 12, namely, below the levers (as viewed in the direction perpendicular to the plane of the drawing sheet), a slider bar 13 is slidably disposed in spaced apart relationship with and transversely of those levers. This slider bar 13 is formed with projections 13a, 13b and 13c engageable with the edges 11c', 11d' and 11e' of the levers, and a projection 13d engageable with the edge 12a' of the through-aperture 12a formed in the subchassis 12. It is to be noted that the embodiment shown in FIG. 2 is different from that of FIG. 1 in that the inclied edge 12a' extends so as to partially overlie the review lever 11d and that in the shown position, the projection 13d is disposed in engagement with the inclined edge 12a' adjacent the left hand side and thereof. In this instance, as already noted, the subchassis 12 overlies the levers 11a to 11e as viewed in the direction perpendicular to the plane of the drawing sheet and therefore, the projection 13d is correspondingly longer than the other projections 13a to 13c. Also, the slider bar 13 is springbiased in the direction of arrow R so that the respective projections are engaged with the inclined edges of the levers and subchassis. The position shown is that in which, as already described, the subchassis 12 has been advanced upon push-in of the playback lever 1b or both of the playback lever and the recording lever 11a. In this position, as shown, in the inclined edge 12a' of the through-aperture 12a formed in the subchassis 12 is engaged with the projection 13d in the through-aperture 12a. Also, the playback lever 11b or both of the playback lever and the recording lever 11a, when so pushed in, are locked by a lock mechanism (not shown) and thereby maintained in their pushed-in position.

The shown position, as already noted, is the recording or the playback position in which the subchassis 12 has been advanced with the pinch roller and head brought into engagement with the tape and with the pinch roller urged against the capstan with the tape nipped therebetween. In this position, when, for example, the tape is to be rewound, namely, the review is to be effected, the review lever 11d is pushed in the direction of arrow. Thereupon, because of the inclined edge 11d' of the lever 11d being engaged with the projection 13b, the slider bar 13 is moved in the direction of arrow R' against the spring bias by a distance determined by the angle of inclination of the inclined edge 11d' and the amount of push-in of the lever 11d and at the same time, the projection 13d keeping engagement with the edge 12a' of the subchassis 12 is moved with the slider bar 13, so that due to the edge 12a' of the subchassis being inclined in the opposite direction to the edges of the levers, the subchassis is retracted in the direction of arrow A' against the spring bias which is acting to advance the subchassis, with a result that the review operation takes place while, at the same time, the pinch roller and head are retracted from the tape, whereby the position in which the pinch roller is urged against the capstan with the tape nipped therebetween is released. However, since in the recording or the play-back position, the head is engaged with the tape to such an extent as to bend the tape in a dog-legged shape, the head is not spaced apart from but keeps engagement with the tape in spite of the retraction of the head.

When in the recording or the playback position, push-in of the playback lever or the rewind lever may cause only the recording lever of the playback lever and the recording lever which are locked by a lock mechanism (not shown), to be unlocked and returned to its initial or unpushed-in position. If the review lever 11d is then released from its pushed-in position, the shown poisiton, i.e. the position in which the playback lever alone is pushed in is immediately released. It will readily be appreciated that the above-described operation may be likewise effected also by pushing in the cue lever 11e.

The construction described above in connection with FIG. 2 may be modified as follows: When the review operation takes place while, at the same time, the pinch roller and head are retracted from the tape as mentioned above, the position in which the pinch roller is urged against the capstan with the tape nipped therebetween is released but, since in the recording or the playback position, the head is engaged with the tape to such an extent as to bend the tape in a dog-legged shape, the head assumes a first retracted position in which it is not spaced apart from but keeps engagement with the tape in spite of the retraction of the head, and a second retracted position in which the head is further retracted out of disengagement with the tape. That is, when in the recording or the playback position, if it is desired to reproduce the recorded signals on the recording tape while rewinding the tape, namely, effecting the review, the review lever 11d is pushed in the direction of arrow as already noted, whereby the subchassis may be retracted in the direction of arrow A' to bring about the first position of the subchassis, as a result of which the pinch roller and head also assume their first retracted position. By this, rewind and playback of the tape may take place at a time. If rewind of the tape is only desired, the subchassis may be moved from its first position to its second position in which the subchassis is further retracted. For this purpose, the review lever 11d is further pushed in the direction of arrow to retract the subchassis to its second position. As a result, the pinch roller and head assume their second position, whereby the head is spaced apart from the tape to permit only the rewind of the tape to take place.

As will be apparent from what has been described above with reference to FIG. 2, the present invention provides a very simple construction in which a common slider bar 13 is provided in association with various levers 11c to 11e and subchassis 12, whereby the intended function described above may be fully performed.

In the above-described embodiment, a through-aperture 12a is formed in the subchassis, whereas instead of such through-aperture 12a, an inclined edge may be provided at one end of the subchassis. Further, although projections 13a to 13d are provided on the slider bar 13 and inclined edges 11c', 11d', 11e' and 12a' engageable with the respective projections 13a to 13d are provided on the respective levers and subchassis, these are not restrictive but if required, the inclined edges may be formed on the slider bar and the projections may be provided on the levers and subchassis, as will be appreciated.

As pointed out above, the inclined edges and the projections acting upon them, could be reversed but, in either event, the projections and inclined edges function as cooperating cam means and the recitation of such means is intended to include either arrangement.

In the above-described embodiment, there are provided all of the recording lever 11a, the playback lever 11b, the pause lever 11c, the review lever 11d and the cue lever 11e, whereas it will be appreciated that the present invention is equally applicable where at least one of the playback lever 11b, the review lever 11d and the cue lever 11e is provided.

Although this invention has been described with respect to some specific embodiments, it is to be understood that the invention is not restricted thereto but covers any and all modifications and changes which may be made within the scope of the appended claims.

What is claimed is:

1. An operating mechanism of a tape recorder having at least one of a recording lever and a playback lever, at least one of a pause lever, a cue lever and a review lever, and a subchassis slidably disposed in parallel, spaced apart relationship with said levers and having a head and pinch roller thereon, wherein said subchassis may be advanced by operating one or both of said recording lever and said playback lever to thereby bring the pinch roller and head into engagement with a tape, and wherein said subchassis may be retracted by operating said pause lever, said cue lever or said review lever when said engaged position is brought about, whereby said pinch roller and said head are spaced apart from said tape, characterized in that an edge inclined in one direction is formed on each of said pause lever, said cue lever and said review lever, a through-aperture having an edge inclined in the opposite direction to said one direction is formed on said subchassis, a slider bar is provided on the opposite side from said subchassis and in spaced apart relationship with and transversely of said pause, cue and review levers, and projections engageable with respective ones of said inclined edges are formed on said slider bar whereby movement of any of said levers in one direction causes its inclined edge to cam said slider bar in one direction and the projection thereon in said through-aperture cams said subchassis in a direction to retract said head and roller from said tape.

2. An operating mechanism of a tape recorder having at least the latter of a recording lever and a playback lever, at least one of a cue lever and a review lever, and a subchassis slidably disposed in parallel, spaced apart relationship with said levers and having a head and pinch roller thereon, wherein said subchassis may be advanced by operating said playback lever on both of said playback lever and said recording lever to thereby bring the head into engagement with a tape and urge the pinch roller against a capstan with the tape nipped therebetween, and wherein said subchassis may be retracted by operating said cue lever or said review lever when said engaged position is brought about, whereby said pinch roller and said capstan may be released from the pressure contact relationship, characterized in that a slider bar is provided in spaced apart relationship with and transversely of said review lever, a first cam means is formed on each of said cue lever and said review lever, first cooperating cam means are provided on said slider bar, a second cam means is formed on said subchassis, and a second cooperating cam means is provided on said slider bar whereby movement of said cue lever or said review lever in one direction causes said first cam means to cam said slider bar in one direction and said second cam means cams said subchassis in a direction to retract said head and roller from said tape.

3. An operating mechanism of a tape recorder having at least the latter of a recording lever and a playback lever, at least one of a cue lever and a review lever, and a subchassis slidably disposed in parallel, spaced apart relationship with said levers and having a head and pinch roller thereon, wherein said subchassis may be advanced by operating said playback lever or both of said playback lever and said recording lever to thereby bring a head into engagement with a tape and urge a pinch roller against a capstan with the tape nipped therebetween, said subchassis may be retracted by operating said cue lever or said review lever when said engaged position is brought about, whereby said subchassis may assume its first position in which said pinch roller and said capstan are released from the pressure contact and its second position in which said subchassis is further retracted from said first position and said head is spaced apart from said tape, characterized in that a slider bar is spaced apart from said tape, characterized in that a slider bar is provided in spaced apart relationship with and transversely of said review lever, a first cam means is formed on each of said cue lever and said review lever, first cooperating cam means engageable with said first cam means are provided on said slider bar, a second cam means is formed on said subchassis, and a second cooperating cam means engageable with said second cam means is provided on said slider bar whereby movement of said cue lever or said review lever in one direction causes said first cam means to cam said slider bar in one direction and said second cam means cams said subchassis in a direction to retract said head and roller from said tape.

* * * * *